July 21, 1953 — A. M. FERRIN — 2,645,851
ADJUSTABLE IMPLEMENT FOR PARING VEGETABLES
Filed April 23, 1951

INVENTOR
A. M. FERRIN,
BY Mason, Porter, Miller & Stewart
ATTORNEYS

Patented July 21, 1953

2,645,851

UNITED STATES PATENT OFFICE 2,645,851

ADJUSTABLE IMPLEMENT FOR PARING VEGETABLES

Arthur Moroni Ferrin, Eden, Utah

Application April 23, 1951, Serial No. 222,460

3 Claims. (Cl. 30—280)

The following specification relates to improvements in an adjustable implement for paring vegetables and fruits as used in the culinary preparation of food products.

Devices of this character are frequently used for rapid and efficient paring of potatoes, carrots, turnips, apples and like materials. Fundamentally, such a device consists of a blade which may be drawn by means of a handle or holder along the surface of the article. Some gauge means are customarily provided to maintain a uniform depth of cut, regardless of the surface inequality of the vegetable or the like. However, due to the different types of vegetables and fruits being prepared, it is desirable to vary the depth of cut. It is also desirable to mount the cutting blade in such a manner that it may be removed for cleaning purposes or for sharpening, or even for replacement.

The implement which is the subject of my invention is of the type above described. It has novel improvements, however, in the fact that with it the depth of the slice or paring may be controlled at the wish of the operator. Further, the blade is easily removable, as occasion may demand.

One of the objects of my invention is to provide an implement by which the depth of the slice or paring may be controlled readily at the volition of the operator.

Another object of my invention is to facilitate the movement of the implement over the vegetable or fruit with the least possible friction and without alteration due to the minor inequalities of the article being pared. Thus, where the article, such as a potato or carrot, has minor creases or wrinkles, these will not affect the depth of slice, as is the case where the gauge is directly connected to the blade movable into and out of the creases as the implement is drawn over the vegetable.

A still further object of the invention is to provide a spring mounting for the blade. In this way the blade may be sprung out of position and removed for cleaning, sharpening or for replacement.

I have illustrated the invention in its preferred form in the accompanying drawings in which.

Figure 1:
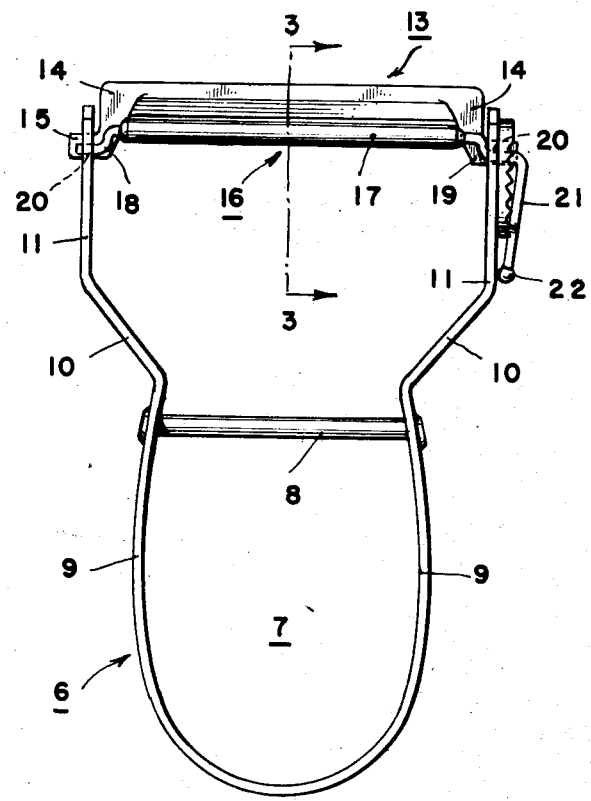
Fig. 1 is a front view of the implement.

Briefly described, my invention consists in a handle having spring-arms in which a paring blade is loosely journaled for being drawn through the vegetable below the skin and parallel to the surface of the latter. The thickness of the cut or paring is determined by a gauge member mounted opposite the edge of the knife and at varying distances laterally from the plane of the knife blade. In this way, the depth of cut is always under control of the operator. Furthermore, the particular shape of the gauge is such that it operates without disturbance from the minor irregularities in the surface of the vegetable.

The device is made from sheet metal and comprises a handle 6 of resilient sheet metal. The mid-portion 7 is the handle proper, and the side portions are held in spaced relation by means of a rivet 8.

The side portions 9, 9 have diverging branches 10, 10, and spaced parallel extensions 11, 11. These branches 10 and extensions 11 are sufficiently resilient to be spread enough to permit the cutting blade to be inserted or removed.

Figure 3:
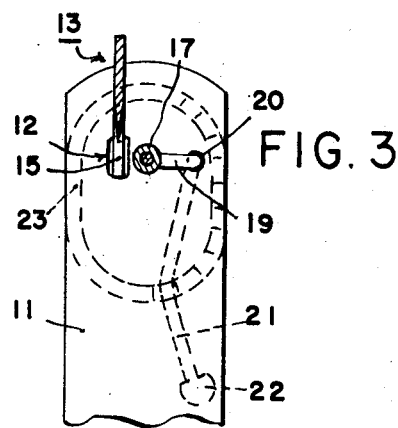
Fig. 3 is an enlarged fragmentary vertical section of the head of the implement taken on the line 3—3 of Fig. 1
Figure 4:
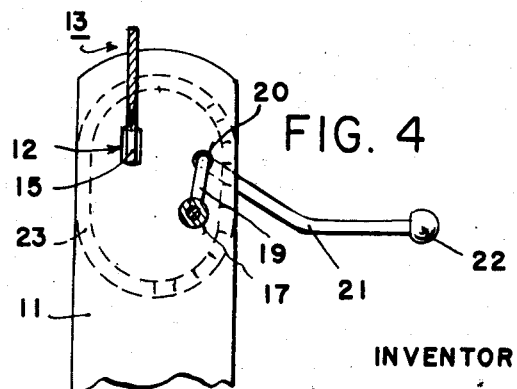
Fig. 4 is a similar view showing a different adjustment of the gauge bar.

The extensions 11, 11 have rectangular slots 12, 12 extending parallel to the side edges of the extensions, as shown in Figs. 3 and 4.

These slots form loose bearings for the cutting blade 13. This blade is made of tool steel with an inner sharpened edge and has offset ends 14, 14, terminating in pivot members 15, 15. The pivot members 15 are relatively smaller than the rectangular slots 12 and may therefore be tilted angularly to follow the line of least resistance when the blade is drawn through the vegetable below the skin surface.

To provide means for adjusting the most desirable depth of cut, I provide a gauge bar 16. This bar has an enlarged center portion 17, in the form of a tube or sleeve. The bar 16 has angular offsets 18, 19. The offset 18 passes through a small opening 20 in one extension 11 at a point slightly to one side of the slot 12. The angular offset 19 of the other end of the gauge bar passes through a similar opening 20 in the opposite extension 11, as shown in Figs. 3 and 4. The offset 19 is extended outside of the extension 11 and is bent angularly to provide a lever 21. This terminates in a knob 22 to facilitate operation.

Figure 2:
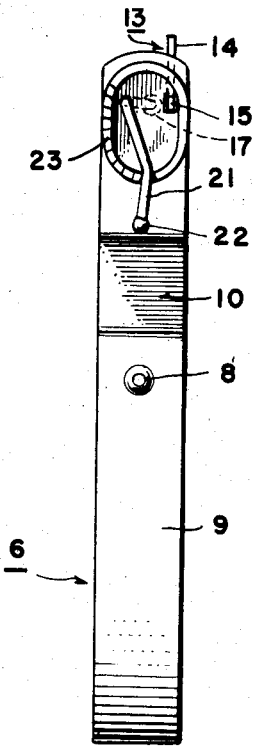
Fig. 2 is a side elevation of the same.

The extension 11 beneath the lever 21 is provided on its outer side with a circular or oval rack 23 which has teeth over a considerable part of its length, as shown in Fig. 2. This rack supports the lever 21. Due to the sharp angle of the offset 19 which bears on the inner side of the corresponding extension 11, the lever 21 is resiliently held between adjacent teeth of the rack.

Fig. 3 shows the lever 21 in a position generally parallel with the extension 11. This brings the sleeve 17 of the gauge 16 close to the normal plane of the blade 13. As the sleeve slides over the surface of the vegetable, it forces the blade to follow a path only slightly below the skin of the vegetable. A minimum paring results.

If, however, the lever 21 is rotated, for example to the extent shown in Fig. 4, the sleeve 17 is moved away from the normal plane of the knife blade. Thus, the knife blade will penetrate further into the vegetable below the skin and result in a materially thicker paring.

Due to the enlarged diameter of the sleeve 17, the gauge rides over creases or similar surface irregularities. As a result, the cut surface of the vegetable is more even and smooth.

Any desired thickness of paring may be obtained by adjusting the lever 21 and, consequently the sleeve 17, to a position intermediate those illustrated in Figs. 3 and 4.

If it is desired to remove blade 13 for cleaning, this may be accomplished simply by spreading the extensions 11, 11 until one pivot member 15 can be removed from the corresponding slot 12.

The resilient extensions 11, 11 resume parallelism when released.

The parts of the device may then be cleaned more readily.

The blade 13 may be returned in a like operation, or it may be replaced by a fresh blade.

The utility of the device above described will be readily apparent. It permits convenient paring of a vegetable or fruit. It is possible to vary the depth of cut in accordance with the particular circumstances and needs. Furthermore, the blade may readily be removed for cleaning and the like.

Other advantages of this device readily suggest themselves, and likewise variations in materials, proportions and minor structural details are possible. The invention therefore is limited only by the scope of the following claims.

What I claim is:

1. A paring implement comprising a frame with resilient parallel arms, a cutting blade journaled loosely between said arms, a gauge bar journaled between the arms parallel to the blade, said bar having an intermediate laterally offset gauging portion opposite the blade, and a lever connected to the bar for variably spacing it relative to the blade.

2. A paring implement comprising a frame with resilient parallel arms, a cutting blade journaled loosely between said arms, a gauge bar, a loose sleeve on the gauge bar, offset ends on the bar at opposite ends of the sleeve, bearings on the arms for journalling the said ends with the bar parallel to the blade, and a lever connected to the bar for adjusting it relative to the blade.

3. A paring implement comprising a frame with resilient parallel arms, a cutting blade journaled loosely between said arms, a gauge bar journaled between the arms parallel to the blade, said bar having an intermediate laterally offset gauging portion opposite the blade, a lever connected to the bar outside of one arm, and a rack on the said arm for adjustable engagement with the lever.

ARTHUR MORONI FERRIN.

References Cited in the file of this patent

UNITED STATES PATENTS

| Number | Name | Date |
| --- | --- | --- |
| 189,967 | Tierney | Apr. 24, 1877 |
| 1,998,493 | De Vellier | Apr. 23, 1935 |
| 2,073,546 | Baker | Mar. 9, 1937 |
| 2,078,817 | Thrasher | Apr. 27, 1937 |
| 2,309,444 | De Vault | Jan. 26, 1943 |

FOREIGN PATENTS

| Number | Country | Date |
| --- | --- | --- |
| 248,171 | Meier | Jan. 3, 1948 |